United States Patent

Gay et al.

Patent Number: 5,600,959
Date of Patent: Feb. 11, 1997

[54] METHOD OF REPLACING THE LUBRICATION PRODUCT IN REFRIGERATION SYSTEMS

[75] Inventors: Marie N. Gay; Nicole Genet, both of Lyon; Pierre Sanvi, Vernaison, all of France

[73] Assignee: Elf Antar France, Courbevoie, France

[21] Appl. No.: 537,742

[22] PCT Filed: May 10, 1994

[86] PCT No.: PCT/FR94/00548

§ 371 Date: Jan. 11, 1996

§ 102(e) Date: Jan. 11, 1996

[87] PCT Pub. No.: WO94/27100

PCT Pub. Date: Nov. 24, 1994

[30] Foreign Application Priority Data

May 11, 1993 [FR] France ................................. 93 05618

[51] Int. Cl.⁶ ........................................................ F25B 43/02
[52] U.S. Cl. ........................................................ 62/84; 62/77
[58] Field of Search ................................. 62/84, 77, 292, 62/468, 303

[56] References Cited

U.S. PATENT DOCUMENTS 5,375,426  12/1994  Burgener ................................ 62/303
5,437,162  8/1995  Eden ..................................... 62/84

*Primary Examiner*—John M. Sollecito
*Attorney, Agent, or Firm*—Oblon, Spivak, McClelland, Maier & Neustadt, P. C.

[57] ABSTRACT

Method of replacement of at least one CFC lubricant compatible with chlorofluorocarbon-containing cooling fluids, by at least one HFC lubricant compatible with hydrofluorocarbon-containing cooling fluids, before the replacement of the CFC fluid by an HFC fluid in a cooling system. The process comprises several rinsing stages consisting in draining the lubricant present in the cooling circuit, filling said circuit with a rinsing fluid, then homogenizing the residual CFC lubrifying mixture with the rinsing fluid by switching on the cooling system, and optionally measuring, in the rinsing fluid, the percentage of lubricant to be eliminated. The method is characterized in that an intermediate fluid compatible with the CFC fluid and capable of solubilizing the CFC lubricant and itself soluble in the HFC lubricant, is added into the first rinsing stage. In a subsequent stage, the intermediate fluid is replaced by the HFC lubricant, preferably when the CFC lubricant in the intermediate fluid is 15% or less. Rinsing with the HFC lubricant is discontinued when the intermediate fluid content in the HFC lubricant is 5% or less.

15 Claims, No Drawings

METHOD OF REPLACING THE LUBRICATION PRODUCT IN REFRIGERATION SYSTEMS

The present invention relates to a method of replacing the lubricant present in the lubrication circuit of existing refrigeration systems while they are being converted to refrigerants which have no effect on atmospheric ozone. This involves changing the lubricant when the chlorofluorocarbon refrigerants present in these systems are replaced by fluorohydrocarbons refrigerants.

This problem of converting existing refrigeration systems is now a matter of urgency throughout the world. On the one hand, the chlorofluorocarbon compounds called CFCs, such as dichlorodifluoromethane or R12, are damaging to the ozone layer in the Earth's atmosphere. On the other hand, as these are causing damage, it was decided to cease manufacturing them by the year 1995 in the signatory countries of the 1987 Montreal Protocol.

Of course, extensive research has been undertaken in industry, whether in the fields of refrigeration or in those of air conditioning, in order to develop replacements for these chloro-fluorocarbon compounds, the required characteristics of which are to be both a good refrigerant and not to damage the ozone layer. The best products found and marketed are the fluorohydrocarbon compounds called FHCs, the most well-known being 1,1,1,2-tetrafluoroethane or alternatively R134a. They have therefore rapidly been used in all new equipment manufactured.

However, those skilled in the art have not yet completely solved the problem of replacing these obsolete refrigerants with the new products in existing equipment.

The reason for this is that, in refrigeration systems, the refrigerants are permanently in contact with a small amount of lubricant, coming from the lubrication circuit of the compressor in the refrigeration system. However, it has been found that the lubricants compatible with refrigerants of the CFC (chlorofluorocarbon) type were no longer suitable for the refrigerants of the FHC (fluorohydrocarbon) type and that they could cause the refrigeration systems to malfunction. Therefore, on account of the low miscibility of the lubricant/refrigerant pair, films of lubricant are deposited on the condenser pipe and on the internal walls of the evaporator, thus considerably decreasing the efficiency of the heat exchange, or else the absence of lubricant generates wear zones in the region of the moving parts of the compressor. It is therefore essential for the lubricant/refrigerant pair to be highly miscible if the cooling performance of the system is to be maintained.

Conventional lubricants based on mineral oil or synthetic oil, known for their miscibility with chlorofluorocarbon compounds such as R12, are therefore not suitable as regards miscibility with the new fluorohydrocarbon compounds such as R134a. However, it is known that the lubricants compatible with the FHCs are generally compatible with the preexisting CFCs. Therefore, before replacing the chlorofluorocarbon compounds by the fluorohydrocarbon compounds in the refrigeration circuit, the lubrication circuit of the compression system is completely drained for the purpose of removing any trace of lubricant incompatible with the fluorohydrocarbon compounds.

However, since the lubrication circuits of the refrigeration systems include inaccessible dead spaces, draining alone does not enable all the lubricant to be removed. Currently, those skilled in the art-carry out repeated flushing of the lubrication circuit with the new lubricant, the refrigeration system being run for at least forty-eight hours after each flushing operation, until the previous lubricant has been virtually completely removed, that is to say the residual concentration of the latter in the new lubricant is less than 1%.

However, it will very quickly be realized that, given the specificity of the lubricants used with the refrigerants, such flushing operations are very expensive on account of the volumes of lubricant which are necessary to drain these circuits.

Although many companies have sought new lubricant compositions compatible with the new fluorohydrocarbon refrigerants such as R134a, relatively few have focused on the method of replacing the lubricant in the lubrication circuit and on the impact of residual products in these new lubricants.

Only CASTROL, in its Patent Application EP-468729, has suggested that it is possible to tolerate a maximum concentration of 5% by weight of lubricant compatible with the CFC refrigerants in the new lubricant compatible with the FHC refrigerants.

In order to simplify the rest of the present description, we will term "CFC lubricant" the lubricants compatible with the chlorofluorocarbon-type refrigerants called CFC fluids and "FHC lubricant" the lubricants compatible with the fluorohydrocarbon-type refrigerants called FHC fluids.

The purpose of the present invention is therefore to provide a means of replacing the CFC lubricant by a FHC lubricant in the lubrication circuit of an existing refrigeration system which is economically more advantageous, that is to say more rapid and less expensive especially by using a smaller amount of FHC lubricant as the flushing fluid.

The subject of the present invention is therefore a method of replacing at least one lubricant compatible with the CFC fluid, called the CFC lubricant, by at least one lubricant compatible with the FHC fluid, called the FHC lubricant before replacing the CFC fluid by the FHC fluid, the said method comprising several flushing steps consisting in draining the CFC lubricant from the lubrication circuit, then in filling the said circuit with a flushing fluid, next in uniformly mixing the CFC lubricant with the flushing fluid by switching on the refrigeration system and finally, possibly, measuring the percentage of lubricant to be removed in the flushing fluid.

The method, forming the subject of the invention, is characterized in that an intermediate fluid compatible with the CFC refrigerant, which is capable of dissolving the CFC lubricant and is itself soluble in the FHC lubricant, is introduced into the lubrication circuit immediately after the first flushing operation, in that, in a subsequent flushing step, this said intermediate fluid is replaced by the said FHC lubricant when the CFC lubricant content in the intermediate fluid is equal to or less than 15% and, finally in that flushing with the FHC lubricant is stopped when the intermediate-fluid content in the FHC lubricant is less than or equal to 5%.

Since each lubrication circuit is always drained in the same way, it is easy to measure its draining factor T; likewise, the number of times X it is necessary to flush with the flushing fluid may be easily determined using the formula:

$T^x \leq A$, where $A=0.01$ when it entails calculating the number of times $X_0$ required to flush with the FHC lubricant alone resulting in a 1% residual CFC-lubricant content in the FHC lubricant and $A=0.15$ when it entails calculating the number of times $X_1$ required to flush with the intermediate fluid before it is replaced by the FHC lubricant.

In the present invention, $X_2$, the number of times it is necessary to flush with the FHC lubricant in order to remove the intermediate fluid, is less than or equal to $(X_0-X_1)$, $X_2$ being known definitely when the measurement of the percentage of the intermediate fluid in the FHC lubricant, after the final filling step, gives a value $\leq 5\%$.

It is thus within the capability of those skilled in the art to optimize the number of times it is necessary to flush in order to limit the number of times $X_1$ to flush using the intermediate fluid and the number of times $X_2$ to flush using the FHC lubricant.

The intermediate fluid will be chosen from substances compatible with the CFC and FHC lubricants, for which the viscosity is between 5 and 40 mPa.s at 40° C., and preferably from those for which the viscosity is between 10 and 25 mPa.s. On account of the fact that, during the flushing steps, within the scope of the present invention, the intermediate fluid must act as a lubricant while the refrigeration system is being run again for the uniform mixing of the flushing fluid and residual lubricant after draining, it exhibits the properties of a lubricating base. Thus, this intermediate fluid is characterized by an impression measured in the 4-ball wear test, according to the NFT 48617 standard, of between 0.40 and 0.50 mm and by a friction film determined by the so-called Cameron Plint test (aluminium/steel friction test on an alternating tribometer), comparable to those obtained for the FHC lubricants.

More precisely, for the present invention, the intermediate fluid consists of at least one compound chosen from the group consisting of alkylbenzenes having linear or branched chains, these chains comprising 4 to 25 carbon atoms, these said alkylbenzenes having a viscosity less than 40 mPa.s. It will be noted here that the alkylbenzenes having a viscosity greater than 40 mPa.s, commonly used in refrigeration systems with a CFC fluid, are not suitable as the intermediate fluid in the implementation of the present invention. Moreover, contrary to the ideas developed in the prior art, it has been found that the residual level of these alkylbenzenes can not be greater than 1% in the FHC lubricant.

Furthermore, in carrying out the invention, the intermediate fluid must not be the cause of wear or corrosion phenomena. Thus, it may advantageously contain 0.01 to 5% by weight, and preferably 0.5 to 2% by weight, of an anti-wear additive chosen from the group consisting of phosphorous or phosphoric acid esters, dialkyl phosphites, such as diphenyl phosphite, dioctyl phosphite and dimethyl phosphite, and trialkyl phosphites, such as trinonyl phosphite and tributyl phosphite.

Likewise, within the scope of the present invention, the fluid may contain 0.05 to 0.5% by weight, and preferably between 0.05 and 0.2% by weight, of at least one corrosion inhibitor chosen from the group consisting of imidazole, benzimidazole, pyrazole, benzotriazole, tolutriazole, 2-methylbenzimidazole and methylenebisbenzotriazole.

Using alkylbenzenes is a great advantage in itself, since they are readily accessible and inexpensive, while still having all the required properties for acting as the intermediate fluid because of their good solubility in the FHC lubricants and their good solvent power with respect to the CFC lubricants used.

Another advantage related to the use of alkylbenzenes, according to the invention, is a substantial reduction in the time to achieve uniform mixing in each flushing step. Thus, this time to achieve uniform mixing is between 5 and 24 hours, depending on the refrigeration system, and preferably between 10 and 18 hours, this already being less than the 24 hours currently required for the flushing steps using the FHC lubricant alone.

The examples below are given by way of non-limiting example in order to explain the characteristics of the present invention.

EXAMPLE 1

The present example describes the implementation of the method of the invention, that is to say the replacement of a CFC lubricant by a FHC lubricant, in a refrigeration system operating as a Carnot cycle. It furthermore aims to compare the conventional method using the FHC lubricant as the flushing fluid and the method according to the invention using a flushing fluid different from the FHC fluid.

This refrigeration system comprises a compressor connected on one side via a first pipe to a condenser operating between 50° and 100° C. itself in communication via a second pipe to an expansion valve, connected via a third pipe to the evaporator which enables temperatures of −25° to −10° C. to be reached, the evaporator itself being connected to the compressor via a fourth and final pipe. The refrigerant circulating in this closed circuit is brought into contact with the lubricant at the compressor, which explains the entrainment of part of the lubricant in this circuit and the need for this to be miscible with the refrigerant, especially when the latter passes into the gaseous state in the evaporator, where the temperatures are between −25° and −10° C.

Before carrying out the first flushing, that is to say the draining of the CFC lubricant, which in this case is a naphthenic mineral oil having a viscosity at 40° C. equal to 32 mPa.s, the refrigeration system, commonly called the unit, is run until equilibrium at about −10° C. is achieved, which will be maintained for 3 or 4 hours. On stopping the unit, when the CFC fluid is returned to the condenser, the compressor is isolated from the rest of the installation, its pressure is returned to atmospheric pressure, and only then is the CFC lubricant drained.

Having put the draining plug back in, the intermediate fluid, in this case an alkylbenzene having a viscosity at 40° C. equal to 22 mPa.s, and then, if necessary, the FHC lubricant, in this case a polyol ester having a viscosity at 40° C. equal to 22 mPa.s, marketed by Elf Lubrifiant under the name PLANETELF ACD22 AW, are introduced in succession.

The air and moisture which may have got into the lubrication circuit are removed by creating a vacuum in the latter. After having connected the circuit to a reservoir containing the necessary amount of flushing fluid, it is filled up once again by the fluid being sucked in, using the partial vacuum previously created in the compressor. The unit is run for 24 hours according to the conventional method or 12 hours according to the invention and then, once again, is stopped. The process for draining and filling the lubrication circuit is carried out as described above. Several flushing operations are thus performed before the final step of filling with the FHC lubricant.

Table 1 below gives the change in the concentrations of the CFC lubricant, of the intermediate fluid and of the HFC lubricant during the uniform-mixing step of the various flushing cycles when the lubricant is replaced using the conventional method or using the method according to the invention.

TABLE 1

| CONVENTIONAL METHOD | | | | | |
|---|---|---|---|---|---|
| Flushing No. | 1 | 2 | 3 | 4 | 5 |
| CFC lubricant (%) | 40 | 18 | 8.1 | 3.6 | 1.0 |
| Intermediate fluid (%) | 0 | 0 | 0 | 0 | 0 |
| HFC lubricant (%) | 60 | 82 | 91.9 | 96.4 | 99 |
| METHOD ACCORDING TO THE INVENTION | | | | | |
| Flushing No. | 1 | 2 | 4 | 4 | 5 |
| CFC lubricant (%) | 36 | 14.5 | 5.3 | 1.4 | 0.3 |
| Intermediate fluid (%) | 64 | 85.5 | 30.3 | 14.5 | 5.0 |
| HFC lubricant (%) | 0 | 0 | 64.4 | 84.1 | 94.7 |

It is found that, by using the intermediate fluid, less than three charges with FHC lubricant are necessary to purge the lubrication circuit of the CFC lubricant, which makes it possible to save approximately two and a half charges compared to the conventional method, whilst at the same time decreasing the time of the operation to replace the lubricants.

In addition, the lubricant mixture resulting from replacement using the method according to the invention gives better miscibility at a temperature of between $-25°$ and $-10°$ C. in the R134a refrigerant (see Table 2 below) than the FHC lubricant mixture containing 1% of CFC lubricant, whatever the concentration of this lubricant in the FHC refrigerant.

TABLE 2

| Lubricant/ R134a ratio by volume | 10/90 | 20/80 | 30/70 | 40/60 |
|---|---|---|---|---|
| FHC lubricant + 1% CFC lubricant | $-10°$ C. | $-5°$ C. | $-4°$ C. | $-11°$ C. |
| FHC lubricant + 5% intermediate fluid | $-13°$ C. | $-11°$ C. | $-11°$ C. | $-14°$ C. |

EXAMPLE 2

The present example aims to distinguish the alkylbenzenes according to the invention from those commonly used as the CFC lubricant.

Table 3 below gives the miscibility temperatures of the FHC lubricant in the R134a refrigerant when this lubricant is used alone and when it contains 5% of alkylbenzene according to the invention, in this case an ISO 22 alkylbenzene having a viscosity at 40° C. equal to 22 mPa.s, or 5% of an ISO 100 alkylbenzene having a viscosity at 40° C. equal to 100 mPa.s.

TABLE 3

| Lubricant/ R134a ratio by volume | 10/90 | 20/80 | 30/70 | 40/60 |
|---|---|---|---|---|
| 100% HFC lubricant | $-31°$ C. | $-23°$ C. | $-22°$ C. | $-23°$ C. |
| 95% HFC lubricant + 5% ISO 100 alkylbenzene | $+1°$ C. | $+1°$ C. | $-4°$ C. | $-9°$ C. |
| 95% HFC lubricant + 5% ISO 22 flushing fluid | $-13°$ C. | $-11°$ C. | $-11°$ C. | $-14°$ C. |

It is found that, in order to maintain good miscibility of the lubricant with the FHC fluid at the evaporator, that is to say at temperatures of between $-25$ and $-10°$ C., only the alkylbenzenes according to the invention may be used and not those commonly used as CFC lubricant.

What is claimed is:

1. A method of replacing at least one CFC lubricant with at least one FHC lubricant in a refrigeration system containing a CFC fluid and a CFC lubricant before replacing the CFC fluid with an FHC fluid comprising:

(1) operating the refrigeration system until equilibrium is achieved and then switching the system off, (2) draining the at least one CFC lubricant from the refrigeration system to leave a residual amount of said CFC lubricant therein, (3) filling the refrigeration system with an intermediate fluid, wherein the intermediate fluid is a fluid which is compatible with the CFC fluid, capable of dissolving the CFC lubricant, and is soluble in the FHC lubricant, (4) switching the refrigeration system on and uniformly mixing the intermediate fluid and the residual CFC lubricant to form a flushing fluid, (5) switching the system off and then draining the flushing fluid, (6) measuring the content of CFC lubricant in the flushing fluid, (7) repeating steps (3), (4), (5), and (6) until the content of CFC lubricant in the flushing fluid is less than or equal to a percentage A, (8) replacing the intermediate fluid in step (3) with the FHC lubricant, (9) repeating steps (3), (4), and (5), except that the FHC lubricant is used in place of the intermediate fluid,

(10) measuring the content of residual intermediate fluid in the FHC lubricant,

(11) repeating steps (9) and (10) until the content of residual intermediate fluid in the FHC lubricant is less than or equal to a percentage B.

2. Method according to claim 1, characterized in that the number o times required to flush with the flushing fluid is determined by using the formula:

$$T^x \leq A$$

where T equals the draining factor of the refrigeration circuit, A=0.01 in order to calculate $X_0$, the number of times required to flush with the FHC lubricant alone and, A=0.15 in order to calculate $X_1$, the number of times required to flush with the FHC lubricant replacing the intermediate fluid being equal to or less than $(X_0-X_1)$.

3. Method according to of claim 1 characterized in that the intermediate fluid has a viscosity of between 5 and 40 mPa.s at 40° C.

4. Method according to one of claim 1, characterized in that the intermediate fluid is a lubricating base for which the impression measured in a 4-ball wear test according to the NFT 48617 standard is between 0.40 and 0.50 mm and which, in the Cameron Plint test, gives a friction film comparable to those obtained for the FHC lubricants.

5. Method according to claim 1, characterized in that the intermediate fluid consists of at least one compound selected from the group consisting of alkylbenzenes having linear or branched chains comprising 4 to 25 carbon atoms and having a viscosity of less than 40 mPa.s at 40° C.

6. Method according to claim 1, characterized in that the intermediate fluid contains 0.01 to 5% by weight, of at least one anti-wear additive selected from the group consisting of phosphorous or phosphoric acid esters, dialkyl phosphites, such as diphenyl phosphite, dioctyl phosphite and dimethyl phosphite, and trialkyl phosphites, such as trinonyl phosphite and tributyl phosphite.

7. Method according to one of claim 1, characterized in that the intermediate fluid contains 0.005 to 0.5% by weight, of at least one corrosion inhibitor selected from the group consisting of imidazole, benzimidazole, pyrazole, benzotriazole, tolutriazole, 2-methylbenzimidazole and methylenebisbenzotriazole.

8. Method according to claim 1, characterized in that the uniform-mixing time during each step (4) is between 5 and 24 hours.

9. Method according to claim 3, wherein the intermediate fluid has a viscosity of between 10 and 25 mPa.s.

10. Method according to claim 6, wherein the intermediate fluid contains 0.05 to 2% by weight of said anti-wear additive.

11. Method of claim 7, wherein the intermediate fluid contains between 0.05 and 0.2% by weight of said corrosion inhibitor.

12. Method according to claim 8, wherein the uniform-mixing time during each flushing step (4) is between 10 and 18 hours.

13. Method of claim 1, wherein percentage A is 15%.

14. Method of claim 1, wherein percentage B is 5%.

15. Method of claim 1, wherein percentage A is 15% and percentage B is 5%.

* * * * *